US005385420A

United States Patent [19]

Newman, Sr. et al.

[11] Patent Number: 5,385,420

[45] Date of Patent: Jan. 31, 1995

[54] COUPLING ASSEMBLY

[76] Inventors: Robert D. Newman, Sr.; Robert D. Newman, Jr., both of P.O. Box 377, Greenwood, Mo. 64034

[21] Appl. No.: 101,582

[22] Filed: Aug. 3, 1993

[51] Int. Cl.⁶ ........................ B25G 3/04; F16B 21/08

[52] U.S. Cl. ........................ 403/299; 403/289; 403/306; 403/342; 15/145

[58] Field of Search ............... 403/287, 289, 299, 300, 403/302, 306, 314, 342, 343; 15/145; 285/921

[56] References Cited

U.S. PATENT DOCUMENTS

| | | | |
|---|---|---|---|
| 3,485,520 | 12/1969 | Alexander | 15/145 |
| 3,682,516 | 8/1972 | Savage | 15/145 |
| 4,406,559 | 9/1983 | Geertsema et al. | 15/145 |
| 4,663,796 | 5/1987 | Helling et al. | 15/145 |
| 4,993,101 | 2/1991 | Newman, Sr. et al. | 15/145 |
| 5,161,278 | 11/1992 | Tomm | 15/145 |
| 5,172,447 | 12/1992 | Tomm | 15/145 |
| 5,288,161 | 2/1994 | Graves et al. | 15/145 X |

*Primary Examiner*—Edward K. Look
*Assistant Examiner*—Michael S. Lee
*Attorney, Agent, or Firm*—Hovey, Williams, Timmons & Collins

[57] ABSTRACT

A threaded snap-fit coupling assembly is provided for use in attaching a handle to an implement, such as a paint brush, paint pad, light bulb changer, cleaning brush or the like. The assembly includes an adaptor provided with a cylindrical receptacle and a male fastening member that is externally threaded and sized for threaded receipt in a threaded opening of the implement so that the adaptor may be connected to the implement. The assembly also includes a coupling provided with a first end that is retained on the handle, and a cylindrical male portion that is externally threaded and sized for threaded receipt in the opening of the implement and for sliding receipt within the receptacle of the adaptor. The coupling is retained on the adaptor via a snap-fit connection when the male portion of the coupling is received in the receptacle of the adaptor. This connection permits removal of the coupling from the adaptor when the coupling is pulled from the receptacle with a force sufficient to overcome the holding force of the snap-fit connection.

9 Claims, 1 Drawing Sheet

COUPLING ASSEMBLY

BACKGROUND OF THE INVENTION

1. Field of the Invention

The present invention relates generally to hand-held tools and, more particularly, to a threaded snap-fit coupling assembly for selectively providing either threaded or snap-fit attachment of a handle to an implement such as a paint brush, paint pad, light bulb changer, cleaning brush, squeegee, window washing equipment or the like.

2. Discussion of the Prior Art

It is known to provide a handle for many hand-held tools such as cleaning brushes, paint pads or the like in order to allow a user to extend the reach of the tools. For example, a handle may be used on a cleaning brush in order to allow the user to stand and walk naturally while scrubbing a floor or large window.

A conventional tool construction comprises a threaded opening formed in the implement for receiving a threaded end of an elongated, cylindrical handle. Thus, when the handle is to be used, it is simply threaded into the opening of the implement. However, numerous drawbacks exist to this construction. For example, because of the threaded connection between the handle and implement, nothing prevents the handle from coming unscrewed from the implement during use, and it is frequently necessary for the user to retighten the handle in the implement.

Another drawback resides in the inability of a user to quickly replace one implement with another on the handle where repetitive tasks are to be performed requiring the use of separate implements. For example, a window washer must commonly replace a cleaning brush with a wiper blade during the cleaning of each window, and may repeatedly switch these tools back and forth on the same handle by unscrewing the handle from one and then screwing the handle into the other. In this type of situation, the simple task of screwing and unscrewing the handle from the tools becomes tedious and time consuming.

Further, where tools are repeatedly replaced on a handle, the threads on both the implement and handle wear more quickly than the rest of the assembly, shortening the life of both implement and handle.

OBJECTS AND SUMMARY OF THE INVENTION

It is an object of the present invention to provide a coupling assembly for a hand-held implement, wherein a handle may be selectively threaded into the implement, or snap-fit into an adaptor attached to the implement so that a user has the ability to quickly change tools on the handle, if desired.

It is another object of the invention to provide a coupling assembly that is easy to use, has few parts, and provides a convenience to the user by allowing the user to quickly replace tools without having to repeatedly screw and unscrew tools from the handle. In addition, the inventive construction results in reduced wear of the handle and implement, lengthening their useful life.

In accordance with these and other objects of the present invention evident from the following description of a preferred embodiment, a threaded snap-fit coupling assembly is provided for use in attaching a handle to an implement. The assembly includes an adaptor provided with a cylindrical receptacle having a diameter larger than the diameter of a threaded opening in the implement, and a male fastening member that is externally threaded and sized for threaded receipt in the opening of the implement so that the adaptor may be connected to the implement, if desired.

A coupling is also provided in the inventive assembly, and includes a handle engaging means for retaining the coupling on the handle, and a cylindrical male portion that is externally threaded and sized for threaded receipt in the opening of the implement and for sliding receipt within the receptacle of the adaptor. A snap-fit connection means that exerts a holding force on the coupling when the male portion of the coupling is received in the receptacle of the adaptor is provided for retaining the coupling on the adaptor. The connection means permits removal of the coupling from the adaptor when the coupling is pulled from the receptacle with a force sufficient to overcome the holding force of the snap-fit connection means.

By providing a coupling assembly constructed in accordance with the present invention, numerous advantages are obtained. For example, because the adaptor may be threaded into the opening of the implement, and the coupling is constructed to both thread into the implement opening and snap into the adaptor, it is possible to employ the single coupling for providing both threaded and snap-fit connection of the handle on the implement. If threaded attachment is desired, the adaptor is simply removed from the assembly, and the coupler threaded directly to the implement. Otherwise, the adaptor is threaded into the implement so that the handle and coupling may be snap-fit onto and off of the implement at will.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENT

Figure 5:
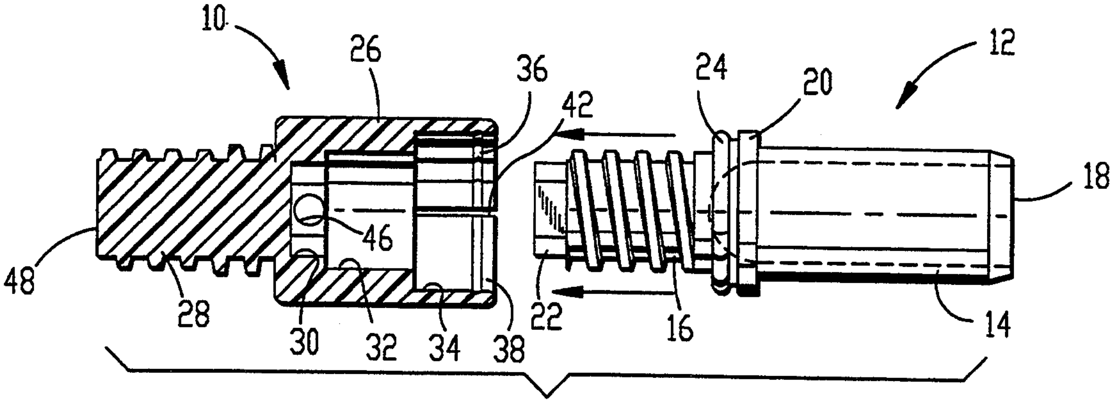
FIG. 5 is an exploded elevational view, partially in section, of the coupling assembly, illustrating the adaptor and coupling disconnected from one another.

A preferred embodiment of a threaded snap-fit coupling assembly constructed in accordance with the present invention is illustrated in FIG. 5, and broadly includes an adaptor 10 and a coupling 12. The assembly is adapted for use between a conventional handle, such as an elongated, tubular handle having a metal or plastic, externally threaded end closure member, and any conventional hand-held implement, such as a paint brush, paint pad, light bulb changer, cleaning brush, wiper blade or the like, having a threaded opening formed therein for receipt of the handle.

The coupling 12 is adapted to replace the conventional end closure member, and includes a handle engaging means 14 at one axial end for retaining the coupling on the handle, and a cylindrical male portion 16 at the opposite axial end that is externally threaded. More particularly, the coupling is generally cylindrical, and the handle engaging means 14 includes an elongated, hollow, tubular section of the coupling that is formed of a diameter adapted for receipt within a tubular pole-type handle. The free end 18 of the tubular section 14 is tapered to facilitate assembly of the coupler and the handle, and an annular flange 20 extends around the circumference of the coupling adjacent the tubular section 14 to define a limit stop against which the end of the handle abuts when the coupling is pushed completely into the handle.

Figure 2:
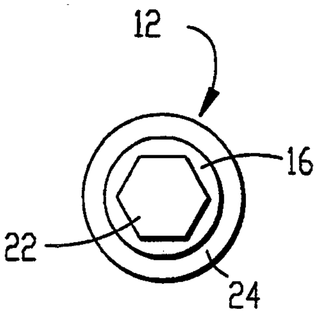
FIG. 2 is a front end elevational view of the coupling.
Figure 1:
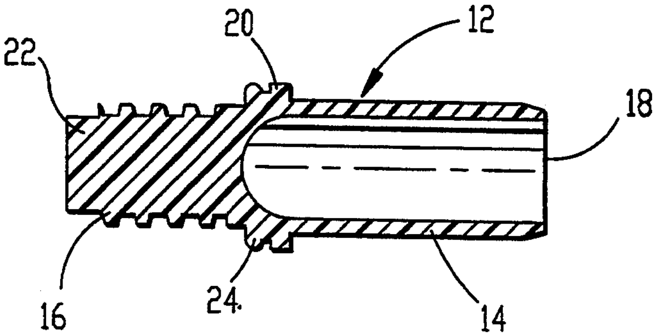
FIG. 1 is a side sectional view of a coupling employed in a preferred embodiment of the present invention.

The opposite axial end of the coupling includes the cylindrical male portion 16, as well as hexagonal head 22, shown in FIG. 2, which extends axially beyond the threaded male portion. Returning to FIG. 5, the threads on the male portion 16 are of substantially uniform diameter, and correspond to the internal threads formed in the opening of the implement so that, if desired, the coupling may be screwed directly into the threaded opening of the implement when the adaptor is not in use.

An annular ridge 24 is provided on the coupling 12 between the male portion 16 and the annular flange 20. The ridge 24 is formed with a curved outer circumferential surface so that it presents a rounded profile, and is of a diameter greater than the diameter of the threads on the male portion 16 so that the ridge extends radially beyond the threads.

The adaptor 10 is shown in FIG. 5, and includes a cylindrical receptacle 26 having a diameter larger than the diameter of the threads provided on the male portion 16 of the coupling, and a male fastening member 28 that is externally threaded and sized for threaded receipt in the opening of the implement so that the adaptor may be screwed into the implement.

Figure 4:
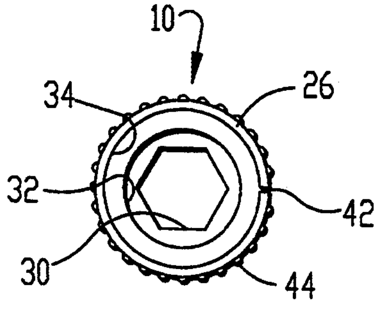
FIG. 4 is a rear end elevational view of the adaptor.

The receptacle 26 includes three axially aligned stepped regions 30, 32, 34. The innermost region 30 includes a hexagonal cross-sectional shape, as shown in FIG. 4, and corresponds in size to the hexagonal head 22 formed on the end of the coupling 12. Although the innermost region 30 of the receptacle and the head 22 of the coupler are hexagonally shaped in the preferred embodiment, it is understood that other polygonal shapes may be substituted.

As shown in FIG. 5, the intermediate region 32 of the receptacle 26 is of smooth cylindrical shape, having a diameter slightly greater than the diameter of the threads of the male portion 16 so that when the coupling is inserted in the receptacle, the threaded male portion slides into and is received by the intermediate region 32. The outer region 34 communicates with the intermediate and inner regions 30, 32 and is also formed of smooth cylindrical shape, having a diameter slightly greater than the diameter of the intermediate region 32 and slightly smaller than the diameter of the annular ridge 24 of the coupling 12.

Figure 6:
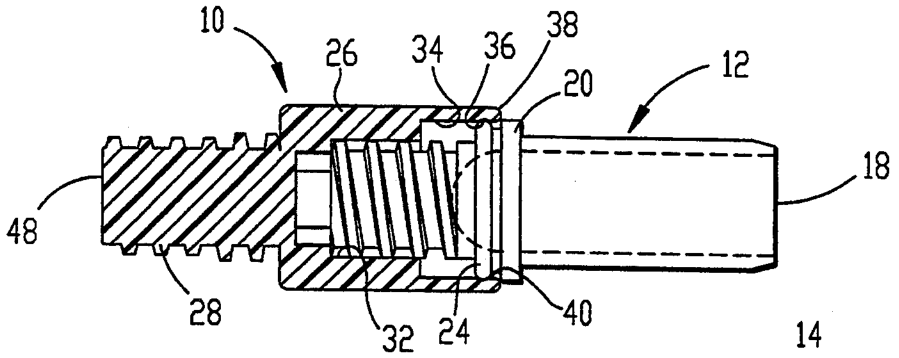
FIG. 6 is an elevational view, partially in section, of the coupling assembly, illustrating the adaptor and coupling connected together.

An annular groove 36 is formed in the outer region of the receptacle and defines a seat within which the annular ridge rests when the male portion of the coupling is inserted in the receptacle, as shown in FIG. 6. The annular groove is spaced from the open end 38 of the receptacle by a short distance, as illustrated in FIG. 5, so that a lip 40 is defined between the end 38 and the groove 36 over which the annular ridge 24 passes during insertion of the coupler into the receptacle.

A longitudinally extending slot 42 is provided in the adaptor 10 through the wall of the receptacle along the length of the outer region 34. This slot 42 allows the wall of the receptacle to be stretched slightly by the coupling 12 as the annular ridge 24 passes over the lip 40 into the groove to provide a snap-fit connection between the coupling and adaptor. The resiliency of the material used to form the adaptor is such that a holding force is exerted on the coupling which retains the coupling on the adaptor until a pulling force is exerted on the coupling sufficient to overcome the holding force.

Figure 3:
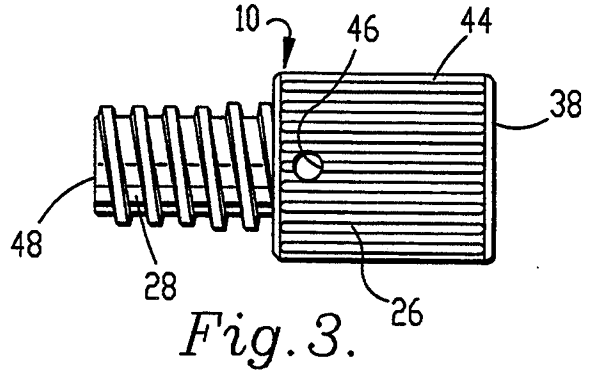
FIG. 3 is a side elevational view of an adaptor employed in the preferred embodiment.

As shown in FIG. 3, the outer surface of the receptacle is provided with a plurality of longitudinally extending ribs 44 which facilitate gripping of the adaptor. In addition, a transverse throughhole 46 is formed in the adaptor, and is suited for receiving a conventional screw driver so that the screw driver may be inserted through the hole and used as a lever to turn the adaptor into the threaded opening of the implement.

The threads on the male fastening member 28 of the adaptor are preferably stepped or tapered such that the thread of the fastening member defines a smaller diameter adjacent the free end 48 than at the end adjacent the receptacle. Further, the diameter of the thread adjacent the receptacle is greater than the diameter of the threaded opening of the implement so that as the adaptor is screwed into the implement, the larger diameter threads adjacent the receptacle engage the opening and secure the adaptor to the implement, providing a friction fit that is difficult to overcome without using a tool to unscrew the adaptor.

The coupling 12 is assembled on a conventional handle at the time of construction of the handle, and is inserted into the handle until the end of the handle abuts the flange. The coupling may be affixed to the handle in a conventional manner, such as through the use of an adhesive or a screw passed through both the handle and coupling so that the coupling does not rotate relative to the handle.

If the handle is to be screwed directly into an implement, the adaptor is not used, and the male portion 16 is threaded directly into the threaded opening of the implement. However, if a snap-fit attachment is desired, the adaptor 10 is manually screwed into the implement as far as possible, and a screw driver is inserted through the hole 46 and used as a lever to further rotate the adaptor so that the large diameter thread of the fastening member 28 engages the opening in the implement and locks the adaptor in place.

Once the adaptor 10 is secured to the implement, the handle is attached simply by pushing the male portion 16 of the coupling into the receptacle 26 until the annular ridge 24 rides over the lip 40 into the annular groove 36. The longitudinal slot 42 allows the material in the adaptor to give, and provides a detented snap fit during assembly which confirms to the user that the handle is locked properly in place. Thereafter, engagement between the head 24 of the coupling and the inner region 30 of the receptacle prevents the handle from rotating relative to the implement, and the handle may only be removed from the implement by pulling it from the receptacle with a force sufficient to overcome the holding force between the groove and the ridge.

In the preferred embodiment, both the coupling and the adaptor are formed of a thermoplastic resin which may be easily molded into the two part shapes. However, it is understood that other materials may be used. Further, although the invention has been described with reference to the preferred embodiment illustrated in the attached drawing figures, it is understood that substitutions may be made and equivalents employed herein without departing from the scope of the invention as recited in the claims.

What is claimed is:

1. A threaded snap-fit coupling assembly for use in attaching a handle to an implement provided with a threaded opening of a predetermined diameter, the assembly comprising:

an adaptor including a cylindrical receptacle having a diameter larger than the predetermined diameter of the threaded opening, and a male fastening member that is externally threaded and sized for threaded receipt in the opening of the implement so that the adaptor may be connected to the implement;

a coupling including a handle engaging means for retaining the coupling on the handle, and a cylindrical male portion that is externally threaded and sized for threaded receipt in the opening of the implement and for sliding receipt within the receptacle of the adaptor; and a snap-fit connection means exerting a holding force on the coupling when the male portion of the coupling is received in the receptacle of the adaptor for retaining the coupling on the adaptor, the connection means permitting removal of the coupling from the adaptor when the coupling is pulled from the receptacle with a force sufficient to overcome the holding force of the snap-fit connection means.

2. A coupling assembly as recited in claim 1, wherein the male fastening member of the adaptor includes a proximal end adjacent the receptacle and a distal end remote from the receptacle, the thread of the fastening member defining a smaller diameter adjacent the distal end than at the proximal end, the diameter of the thread adjacent the proximal end being greater than the diameter of the threaded opening of the implement.

3. A coupling assembly as recited in claim 1, wherein the snap-fit connection means includes a detent between the receptacle of the adaptor and the male portion of the coupling for holding the adaptor in the receptacle when the male portion is inserted into the receptacle with a force overcoming the detent.

4. A coupling assembly as recited in claim 1, further comprising a means for preventing relative rotation between the coupling and the adaptor while the coupling is retained in the receptacle.

5. A coupling assembly as recited in claim 4, wherein the means for preventing relative rotation between the coupling and the adaptor includes a axially extending polygonal projection on the coupling, and a mating polygonal recess in the receptacle within which the projection is received while the coupling is retained in the receptacle.

6. A coupling assembly as recited in claim 1, further comprising a transverse hole extending through the receptacle for allowing installation of the adaptor in the threaded opening of the implement.

7. A coupling assembly as recited in claim 1, wherein the receptacle includes an outer circumferential wall and a longitudinally extending slot formed in the wall for permitting the adaptor to receive the coupling when the coupling is inserted in the receptacle.

8. A coupling assembly as recited in claim 7, wherein the coupling includes an annular ridge intermediate the handle engaging means and the cylindrical nail portion, and the adaptor includes an annular groove formed within the receptacle, the ridge and groove together defining a detent between the receptacle of the adaptor and the male portion of the coupling for holding the adaptor in the receptacle when the male portion is inserted into the receptacle with a force overcoming the detent.

9. A coupling assembly as recited in claim 8, wherein the coupling includes an annular flange for positioning the coupling relative to the handle, the flange being located on the coupling between the annular ridge and the male fastening member.

* * * * *